United States Patent
Wronski, Jr.

(10) Patent No.: US 7,461,028 B2
(45) Date of Patent: Dec. 2, 2008

(54) METHOD AND SYSTEM FOR AUTHORIZING USE OF A TRANSACTION CARD

(75) Inventor: John S. Wronski, Jr., Shelton, CT (US)

(73) Assignee: Pitney Bowes Inc., Stamford, CT (US)

( * ) Notice: Subject to any disclaimer, the term of this patent is extended or adjusted under 35 U.S.C. 154(b) by 1372 days.

(21) Appl. No.: 09/995,218

(22) Filed: Nov. 27, 2001

(65) Prior Publication Data

US 2003/0101137 A1    May 29, 2003

(51) Int. Cl.
*G06Q 40/00* (2006.01)
(52) U.S. Cl. .............. 705/44; 705/67; 235/380; 235/379; 713/182; 726/1
(58) Field of Classification Search ............... 705/44, 705/36, 37, 67; 235/380, 379; 713/182; 726/1
See application file for complete search history.

(56) References Cited

U.S. PATENT DOCUMENTS

| | | | |
|---|---|---|---|
| 3,573,731 A | | 4/1971 | Schwend |
| 3,594,727 A | * | 7/1971 | Braun ........................ 340/152 |
| 5,350,906 A | * | 9/1994 | Brody et al. ................. 235/379 |
| 5,500,513 A | * | 3/1996 | Langhans et al. ............ 235/380 |
| 5,671,280 A | | 9/1997 | Rosen ......................... 380/24 |
| 5,845,260 A | * | 12/1998 | Nakano et al. ............... 705/26 |
| 5,897,622 A | * | 4/1999 | Blinn et al. .................. 705/26 |
| 5,914,472 A | * | 6/1999 | Foladare et al. ............. 235/380 |
| 5,999,596 A | * | 12/1999 | Walker et al. ............. 379/91.01 |
| 6,023,682 A | | 2/2000 | Checchio ..................... 705/18 |
| 6,029,153 A | | 2/2000 | Bauchner et al. .............. 705/42 |

(Continued)

FOREIGN PATENT DOCUMENTS

DE    100 09 710    9/2001

(Continued)

OTHER PUBLICATIONS

Stusser, D.I. "Telecom management catches up with technology," Net work Management, vol. 10, No. 1, Jan. 1992 p. 73-76.*

(Continued)

*Primary Examiner*—Daniel S. Felten
(74) *Attorney, Agent, or Firm*—Joseph C. Kirincich; Angelo N. Chaclas

(57) ABSTRACT

A method for authorizing purchases by an owner of an account previously established with a bank where the owner wants to purchase an item from a merchant. The method including the step(s) of: (i) providing a plurality of authorization parameters potentially available for use in calculating an authorization code associated with a transaction to purchase the item; (ii) defining a selected subset of the plurality of authorization parameters; (iii) establishing respective authorization parameter data for each of the selected authorization parameters; (iv) calculating the authorization code corresponding to the established authorization parameter data; (v) providing the authorization code to the owner; (vi) receiving the authorization code and transaction data from the merchant at the bank; (vii) calculating a confirmation authorization code from the transaction data corresponding to the selected parameter data; and (viii) comparing the authorization code with the confirmation authorization code to determine whether or not to approve the transaction.

22 Claims, 2 Drawing Sheets

U.S. PATENT DOCUMENTS

| | | | |
|---|---|---|---|
| 6,052,675 A | 4/2000 | Checchio | 705/44 |
| 6,078,908 A | 6/2000 | Schmitz | |
| 6,088,686 A | 7/2000 | Walker et al. | 705/38 |
| 6,095,413 A | 8/2000 | Tetro et al. | 235/380 |
| 6,122,625 A | 9/2000 | Rosen | 705/65 |
| 6,131,810 A | 10/2000 | Weiss et al. | 235/379 |
| 6,188,309 B1 | 2/2001 | Levine | 340/5.66 |
| 6,339,766 B1 * | 1/2002 | Gephart | 705/44 |
| 6,354,490 B1 | 3/2002 | Weiss et al. | 235/379 |

FOREIGN PATENT DOCUMENTS

| | | |
|---|---|---|
| EP | 0 745 961 A2 | 12/1996 |
| EP | 0 745 961 A3 | 12/1996 |
| JP | 58049575 * | 3/1984 |
| WO | WO 01/01361 | 1/2001 |
| WO | WO 00/42486 | 7/2002 |

OTHER PUBLICATIONS

Bush et al., "Expanding the role of private switching systems," Bell Laboratories Record, Oct. 1979. p. 243-248.*
Cottrill et al., "Siemens Saturn EPBXs- systems for tomorrow's needs." Telcom Report, vol. 10, No. 5 Sep.-Oct. 1987. p. 278-283.*
Davis et al., "Evolution in business networking." Telesis, vol. 15, No. 3, p. 22-31, 1988.*
Certified Copy of U.S. Appl. No. 60/189,287, Filing Date: Mar. 14, 2000, PCT Application No. PCT/US01/08547.

* cited by examiner

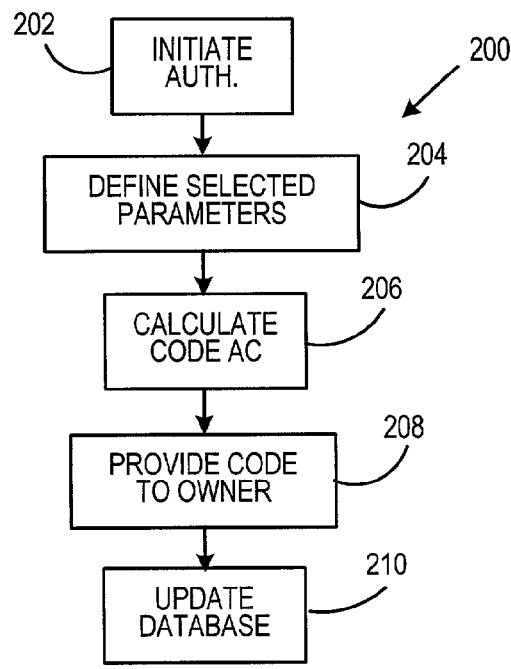
FIG. 2
$$AC = DES \{ PD_1, PD_2, \cdots PD_N; K \} = CAC$$
FIG. 2A
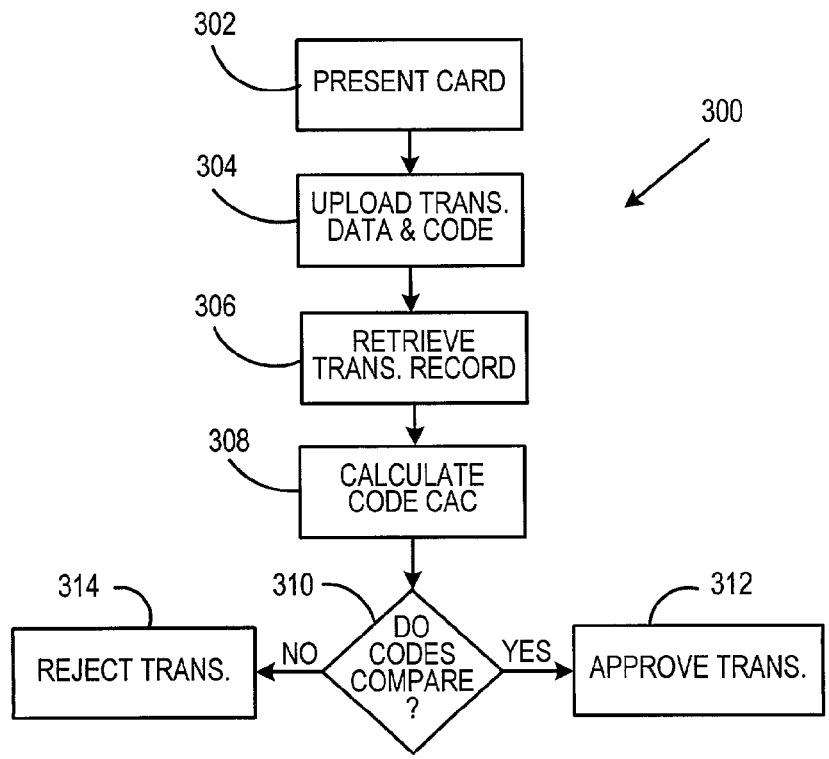
FIG. 3

METHOD AND SYSTEM FOR AUTHORIZING USE OF A TRANSACTION CARD

FIELD OF THE INVENTION

The present invention relates generally to authorizing use of a transaction card. More particularly, the present invention relates to a system and methods directed to securing transaction cards from fraudulent use by establishing an authorization code in anticipation of a transaction.

BACKGROUND OF THE INVENTION

Transaction cards (credit or debit) are well known in the art. Generally, transaction cards have gained wide acceptance because of their convenience for the purchaser as a replacement for cash and for the certainty of payment for the merchant as opposed to personal checks. The typical transaction card includes the owner's name and account information (issuing bank, account number, expiration date, etc.). This data may be embossed on the card and/or stored in memory on the card. Since this critical data is not hidden, there exists a risk of fraud. In a traditional transaction, the purchaser presents the transaction card to the merchant who in turn receives an authorization approving the transaction from the purchaser's bank that issued the transaction card. However, it is the merchant's responsibility to ensure that the person presenting the transaction card is the actual owner of the transaction card. Thus, the merchant typically will request picture identification from the purchaser and/or compare the purchaser's signature to a signature on the transaction card.

Although this system works generally well, there are significant disadvantages. First, there is a reliance on the diligence of the owner and the merchant to defect fraud. Lost or stolen transaction cards may be used to complete a transaction if the owner is not quick to inform the issuing bank and the merchant is not diligent in requesting identification and comparing signatures. Lost or stolen transaction cards go unreported because the owner may not discover the problem until several days have passed. Merchants are not always diligent because of the high turn over rate and low skill sets of the employees that are processing the transactions at the check out counter. Second, there is an increasing trend to use transaction cards in some transactions (via the internet, phone, facsimile or mail) that do not occur in person (face to face). Therefore, the merchant has no ability to request picture identification or compare signatures. This increases the likelihood that a lost or stolen transaction card could be used fraudulently. Third, unscrupulous people may get access to the transaction card data (name, bank, account number, expiration date, etc.) even if the owner is still in possession of the transaction card. This occurs because the transaction card data is often openly available. As examples, the transaction card data is printed on receipts and bank statements that may be viewed by unintended people. As another example, unscrupulous people may monitor the electronic transactions or overhear telephone transactions to obtain the data. Still another example is computer hackers breaking into the database of the issuing bank and stealing whole volumes of transaction card data. Yet still another example is unauthorized use of the transaction card data by the merchant's point of sale staff that may use the transaction card data for their own purchases or sell the information to others.

One attempt at a security measure to address this issue is described in U.S. Pat. No. 6,052,675 which is directed to preauthorizing a credit card for a particular transaction that is contemplated to occur in the future. In anticipation of a transaction, the credit card owner provides the bank with the owner's account number and requested network data or vendor information. Then, during the transaction approval process, the vendor transmits the account number and requested network data to the bank for verification. If the network data requested of the user and the network data received from the vendor match, then the transaction is approved. Otherwise, the transaction is not approved.

Although this security measure adds a degree of increased security, it suffers from disadvantages and drawbacks. First, merely because the owner inputs network data in advance of the transaction does not reduce all aspects of fraud. For example, if the bank requests that the owner input the location (city/town, state) of the vendor, then a lost or stolen credit card may still be successfully used by an unscrupulous person in that location. The bank would automatically disapprove only uses outside of the specified location. As another example, if the bank requests that the owner input the date and/or time of the anticipated transaction, then the unscrupulous person may still be able to use the credit card on that date. Only uses outside of the specified data and/or time would be disapproved. Similarly, if the bank requests that the owner input the vendor name, then the unscrupulous person may be fortunate enough to use the lost of stolen credit card with the named vendor, especially where the named vendor is a large retailer or department store. Therefore, the opportunity for fraud still exists. Second, having the bank request the network data from the owner may not provide the owner with the type of control the owner desires. On one hand, the bank may dictate too much specificity by requesting input of a varied type and detailed amount of network data. This may be too restrictive to meet the needs of the owners. For example, where the owner desires broader privileges, the input of detailed network data may be time consuming when multiple transactions are contemplated. On the other hand, the bank may not designate sufficient type and amount of network data. In this instance, the owner may not be able to appropriately limit the use of the card in the manner desired by the owner.

Therefore, there is a need for a method and system that provides increased protection against fraud while providing the transaction card owner with flexibility in defining what transactions are authorized. In this way, the banks incur fewer losses due to fraud and the owners gain increased control over the use of the transaction card.

SUMMARY OF THE INVENTION

The present invention seeks to provide increased security for the banks and increased control for the owner of a transaction card.

In accordance with the present invention, a method for authorizing purchases by an owner of an account previously established with a bank where the owner wants to purchase an item from a merchant is established. The method includes the step(s) of: (i) providing a plurality of authorization parameters potentially available for use in calculating an authorization code associated with a transaction to purchase the item; (ii) defining a selected subset of the plurality of authorization parameters; (iii) establishing respective authorization parameter data for each of the selected authorization parameters; (iv) calculating the authorization code corresponding to the established authorization parameter data; (v) providing the authorization code to the owner; (vi) receiving the authorization code and transaction data from the merchant at the bank; (vii) calculating a confirmation authorization code from the transaction data corresponding to the selected parameter data;

and (viii) comparing the authorization code with the confirmation authorization code to determine whether or not to approve the transaction.

In accordance with the present invention, a transaction processing system and a method of operating a transaction processing data center are also provided.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts.

FIG. 2 a flow chart of a transaction authorization routine executed by a bank in response to input from an owner of a transaction card in accordance with the present invention.

FIG. 2A is an equation representing how an authorization code is calculated in response to owner's inputs in accordance with the present invention.

FIG. 3 a flow chart of a transaction approval routine executed by a bank in response to input from a merchant after the owner has presented the transaction card in accordance with the present invention.

DETAILED DESCRIPTION OF THE PRESENT INVENTION

Figure 1:
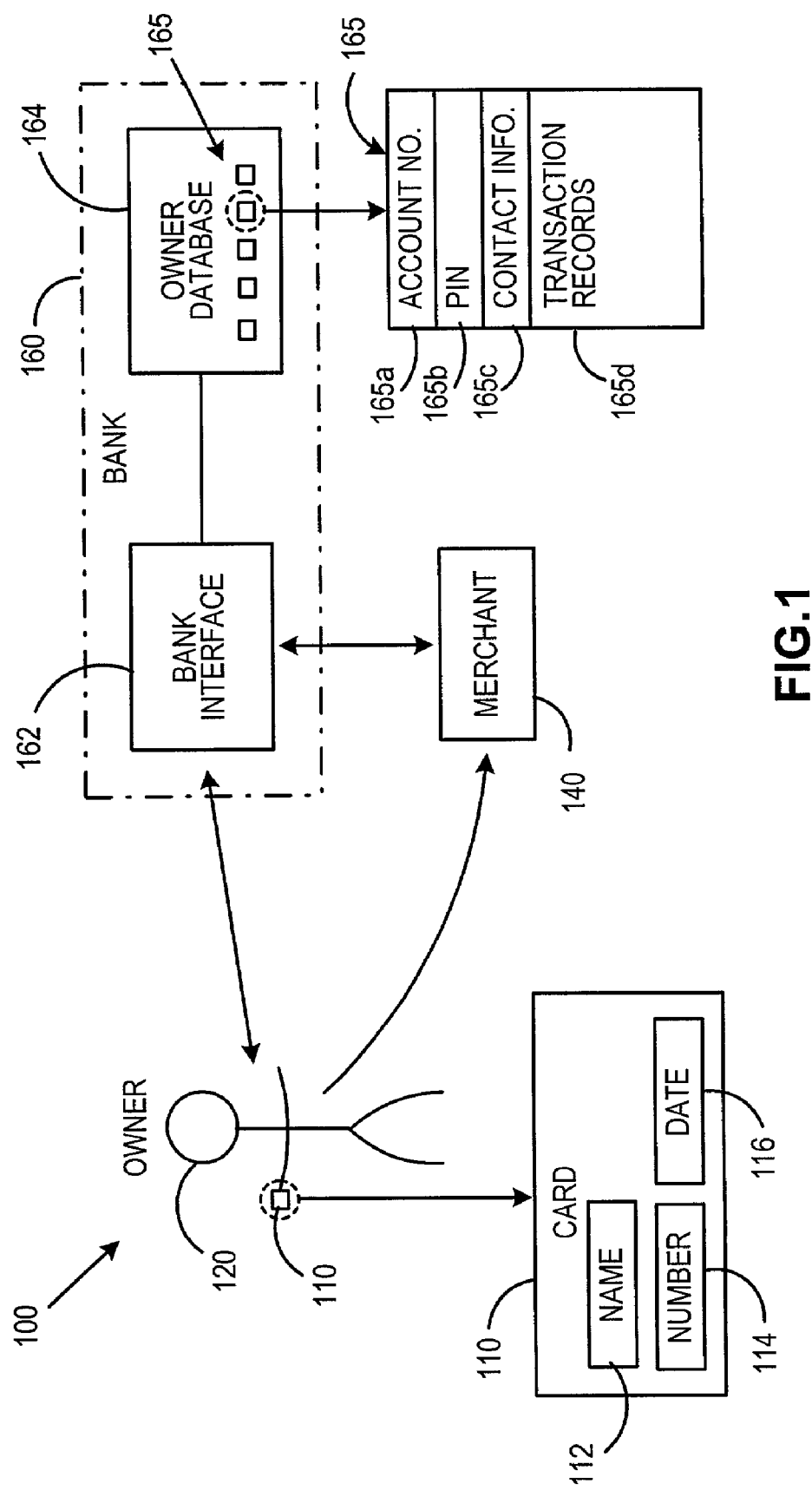
FIG. 1 is a diagrammatic representation of a transaction card processing system in accordance with the present invention.

Referring to FIG. 1, a diagrammatic representation of a transaction processing system 100 is shown. Typical transactions include an owner or card holder 120, a merchant 140 offering items (goods and/or services) for sale and a bank 160. The bank 160 issues a traditional transaction card 110 (either credit, debit or the like), or other suitable transaction enabling device (smart card, personal digital assistance, other integrated circuit device, etc.), to the owner 120 for use in consummating financial arrangements associated with the owner's purchases. The card 110 is typically issued to a particular owner or owners 120 whose name 112 appears on the face of the transaction card. Other information or data, such as an account number 114 and an expiration date 116, may also appear on the card 110. The account number 114 uniquely identifies the owner 120 to the bank 160 while the expiration date 116 provides a date past which the card 110 may no longer be used. Oftentimes, this card information (name 112, account number 114 and expiration date 116) is also stored in a memory device (not shown) associated with the card 110, such as a magnetic stripe (not shown) located on the back of the card 110.

The bank 160 includes a data center having a bank interface 162 and an owner account database 164 in operative communication with the bank interface 162. The owner 120 and the merchant 140 may interface with the bank 160 via the bank interface 162 in any conventional manner, such as: mail, telephone—person to person, telephone—automated voice response, computer, internet browser or any combination of the above. Those skilled in the art will recognize that the types of communications that are made available by the bank 160 for the owner 120 and the merchant to access will govern the design of the bank interface 162. Similarly, the owner account database 164 may also be of any conventional design, such as a grouping of a plurality of owner account information files 165 that are searchable and updateable by the bank interface 162. Each of the account information files 165 contain an account number 165$a$, corresponding to the account number 114 from the owner's card 110, a personal identification number (PIN) 165$b$, contact information 165$c$, such as the owner's name 112 and mailing address, and one or more transaction authorization records 165$d$. For the sake of brevity, the details of the bank interface 162 and the database 164 will be limited to that which facilitates an understanding of the present invention.

Referring to FIGS. 2 and 2A, in view of the structure of FIG. 1, a flow chart depicting a transaction authorization routine 200 is shown. The transaction authorization routine 200 is carried out prior to the owner purchasing an item (an article of goods or a service) from the merchant 140. At 202, the owner 202 initiates the authorization process by contacting the bank 160 via the bank interface 162 in any conventional manner. Most preferably, the owner 202 must log on to the bank interface 162 by entering the account number 114 and the owner's personal identification number (PIN). In this way, the bank 160 may be sure that the rightful holder of the card 110 is contacting them. For the sake of simplicity, it is assumed that the verification of the account number 114 and the PIN transmitted by the owner 120 is successful. Next, at 204, the bank 160 presents the owner 120 with a plurality of authorization parameters available for selection by the owner 120. The authorization parameters are types of information that may be used to identify or distinguish between different transactions. As examples, the plurality of authorization parameters may include: time, date, cost, location, merchant name, merchant category, item name, item category, transaction sequence number, and the like. Generally, if the plurality of authorization parameters is robust and diverse, then the owner 120 is better able to control the use of the card 110. Choosing from the plurality of available authorization parameters, the owner 120 selects a subset of authorization parameters that will control the subsequent use of the card 110 and enters appropriate respective authorization parameter data for each of the selected authorization parameters. Most preferably, the plurality of authorization parameters may be expressed in either absolute terms, limits or ranges. For example, the date may be expressed as a particular day or a range of days, weeks or months. As another example, the location may be expressed as a zip code, a grouping of zip codes, an actual street address, a city/town, a grouping of cities/towns, a state, a grouping of states, a country, a grouping of countries or the entire world. Next, at 206, the bank 160 calculates an authorization code (preferably an alphanumeric string or the like) for use in making approval determinations for subsequent purchase transactions. Most preferably, the bank 160 uses an encryption technique according to the equation shown in FIG. 2A, where: AC represents the authorization code; $PD_1$, $PD_2$ ... $PD_N$ represent the selected parameter data associated with each of the selected authorization parameters numbered 1 through N, respectively; DES represents a Data Encryption Standard encryption algorithm engine; and K represents a cryptographic key used to perform the encryption. Those skilled in the art will recognize that the selected parameter data $PD_1, PD_2 \ldots PD_N$ and the key K are combined using a sequence of logical operations (ORs, exclusive ORs, ANDs, and the like) according to the algorithm so that a unique authorization code AC is generated. Thus, the authorization code AC is representative of the selected parameter data $PD_1, PD_2 \ldots PD_N$, but not readily derivable by an outsider. Next, at 208, the bank 160 provides the authorization code AC to the owner 110 in any conventional manner. Next, at 210, the bank 160 updates the database 164 with the information from the transaction authorization routine 200. Most preferably, this involves storing the authorization code AC provided to the owner and the associated selected parameter data $PD_1, PD_2 \ldots PD_N$ as a transaction authorization record 165d in the owner's account information file 165.

Referring to FIG. 3, in view of FIGS. 2 and 2A and the structure of FIG. 1, a flow chart depicting a transaction approval routine 300 is shown. For the sake of simplicity, it is assumed that the owner 120 has selected an item for purchase from the merchant 140. At 302, the owner 120 presents the card 110 and the authorization code AC to the merchant 140 to facilitate payment for the item. Next, at 304, the merchant 140 uploads or otherwise transmits transaction data to the bank 160. The transaction data will include information associated with the particular transaction (time, date, merchant name, merchant location, item name, item amount and the like), the account number 114 and the authorization code AC. Next, at 306, the bank 160 uses the received transaction data to retrieve the transaction authorization record 165d from the owner account file 165. This may be accomplished using conventional techniques to search the owner database 164 for the particular owner account file 165 corresponding to the received account number 114 and/or the received authorization code AC. Next, at 308, the bank 160 calculates a confirmation authentication code CAC according to the same formula, as shown in FIG. 2A, used to calculate the authentication code AC. The bank 160 uses the associated selected parameter data $PD_1, PD_2 \ldots PD_N$ from the transaction authorization record 165d to identify those corresponding components of the transaction data for input into the equation shown in FIG. 2A. Next, at 310, a determination is made whether or not the authentication code AC provided to and uploaded by the merchant 140 compares with the confirmation authentication code CAC. Generally, since the same equation with corresponding inputs is being used to calculate the authentication code AC and the confirmation authentication code CAC, the codes AC and CAC should match identically. If, at 310, the answer is yes, then at 312 the transaction is approved and the bank 160 transmits an approval notice to the merchant 140. This is because the owner 120 was able to provide the merchant 140 with the correct authorization code AC for the transaction due to the transaction authorization routine 200 described above. On the other hand, if, at 310, the answer is no, then at 314 the transaction is rejected and the bank 160 transmits a rejection notice to the merchant 140. This is because the person attempting to consummate the transaction has failed to provide the correct authorization code AC. Likely, this is because the person is not the owner 120 and is attempting to use the card 110 fraudulently.

Referring to FIGS. 1, 2, 2A and 3, with the structure and operational characteristics of the transaction processing system 100 described generally as above, a few illustrative examples of how the present invention may be employed will now be described.

In a first example, the owner 120 anticipates going to the mall (not shown) and doing some shopping. Although the owner 120 wishes to employ the security features of the present invention, the owner 120 does not want to be unnecessarily restricted because the owner 120 does not know what items from which merchant 140 will be purchased. Therefore, the owner 120 merely designates the current date and the zip code of the mall as the selected parameter data $PD_1$ and $PD_2$ and receives a first authentication code $AC_{1a}$ from the bank 160. The owner 120 may then successfully use the card 110 along with the first authentication code $AC_{1a}$ at the mall, or with any other merchant 140 within the same zip code as the mall, all day. However, the card 110 may not be used on subsequent days or at other locations. Therefore, the owner 120 and the bank 160 are protected if the card 110 is lost, stolen or hacked on the way to the mall or subsequent to leaving the mall. Because of the parameter data selected by the owner 120, the first authentication code $AC_{1a}$ is the same for all the transactions no matter what types of purchase transactions (hair cut, book, food, etc.) or transaction amounts are conducted. All that is controlled is the date and location.

In a second example, the owner 120 anticipates going to the several different merchants 140 that are geographically dispersed. In this case, the owner 120 wishes to employ the different security aspects of the present invention in a manner that is still not overly restrictive. Here again, the owner 120 does not know what items from which merchant 140 will be purchased. Therefore, the owner 120 merely designates the current date and the transaction sequence number as the selected parameter data $PD_1$ and $PD_2$. Furthermore, the owner 120 contemplates up to five (5) transactions. Therefore, the owner 120 receives five authentication codes $AC_{2a}$, $AC_{2b}, AC_{2c}, AC_{2d}$ and $AC_{2d}$ from the bank 160, where the first authentication code $AC_{2a}$ is good for the first transaction on the current date, the second authentication code $AC_{2a}$ is good for the second transaction on the current date, and so on. As a result, the owner 120 may then successfully use the card 110 along with the first authentication code $AC_{2a}$ at any location and with any merchant 140 for any item at any price for the first transaction that day. Likewise, the owner 120 may use the remaining authorization codes $AC_{2b}, AC_{2c}, AC_{2d}$ and $AC_{2d}$ in similar fashion. Here again, the card 110 may not be used on subsequent days because the five authentication codes $AC_{2a}$, $AC_{2b}, AC_{2c}, AC_{2d}$ and $AC_{2d}$ will go stale. Additionally, since the five authentication codes $AC_{2a}, AC_{2b}, AC_{2c}, AC_{2d}$ and $AC_{2d}$ must be used in sequence, the first authentication code $AC_{2a}$ cannot be used for any transaction other than the first transaction of the day. In corresponding fashion, the same is true for the remaining authorization codes $AC_{2b}, AC_{2c}, AC_{2d}$ and $AC_{2d}$. Therefore, the owner 120 and the bank 160 are protected if an unscrupulous person (merchant teller, next person in line, hacker, etc.) observes a transaction and obtains the card number 114 and one of the five authentication codes $AC_{2a}, AC_{2b}, AC_{2c}, AC_{2d}$ and $AC_{2d}$ because the utility of the used authentication code has been exhausted and the card 110 cannot be used without the next sequential one of the five authorization codes $AC_{2a}, AC_{2b}, AC_{2c}, AC_{2d}$ and $AC_{2d}$.

In a third example, the owner 120 anticipates buying a refrigerator, but does not know when, where, from whom or at what price. Accordingly, the owner 120 employs the security features of the present invention in a manner consistent with this objective and in view of the lack of information. Therefore, the owner 120 merely designates the item name (refrigerator) or item category (household appliances, kitchen appliances, or the like) as the selected parameter data $PD_3$ and receives an authentication code $AC_3$ from the bank 160. The owner 120 may then successfully use the card 110 along with the authentication code $AC_3$ on anytime/date, at any location, with any merchant 140 and for any amount of money. Therefore, the owner 120 and the bank 160 are protected if the card 110 is lost, stolen or hacked because the card 110 and the authentication code $AC_3$ can only be successfully used for a specific type of transaction. For instance, if the owner 120 selects the item name, then only refrigerator purchases are allowed. On the other hand, if the owner 120 selects the item category, then only appliance (refrigerator, dish washer, microwave, etc.) purchases are allowed.

In a forth example, the owner 120 wishes to allow another designated person (spouse, child, etc.) to conduct a transaction using the card 110. In this case, the owner 120 contemplates allowing the owner's child to purchase stereo equipment as a present. However, the owner 120 does not know when, where or from whom the child may make the purchase. Additionally, the owner 120 wishes to place a limit on the transaction amount. Accordingly, the owner 120 employs the security features of the present invention in a manner consistent with these objectives and in view of the lack of information. Therefore, the owner 120 merely designates the item category (consumer electronics, stereo equipment, or the like) and a predetermined transaction amount as a price limit as the selected parameter data $PD_{4a}$ and $PD_{4a}$, respectively. Then, the owner 120 receives an authentication code $AC_4$ from the bank 160 and provides it to the child. The child may then successfully use the card 110 along with the authentication code $AC_4$ on any time/date, at any location, with any merchant 140, for a limited purpose (stereo) and for a limited amount of money. Therefore, the owner 120 and the bank 160 are protected if the card 110 is lost, stolen or hacked because the card 110 and the authentication code $AC_4$ can only be successfully used for a specific type of transaction. Accordingly, the child may not use the card 110 for other purchases (alcohol, automobile, etc.) that have not been specified by the owner 120.

Those skilled in the art will now recognize that the owner 120 may exercise as much or as little control over the use of the card 110 as desired. Additionally, since the account information file 165 may hold a plurality of transaction authorization records 165d, the owner may concurrently have more than one anticipated transaction outstanding. Therefore, the bank 160 may optionally specify a limit on the number of transaction authorization records 165d that may be outstanding at any given time.

Optional variations on implementing the present invention may also be employed. For example, the generation of the authorization code AC may be conducted on a personal digital assistance (PDA) or other mobile computing device. In this way, the owner 120 may enter the subset of the plurality of authorization parameters into the PDA, running suitable application/client software provided by the bank 160, and calculate the authorization code AC. Thus, the owner 120 may do this real time while shopping and without communicating with the bank 160. Then, the PDA or the merchant 140 may upload the subset of the plurality of authorization parameters, the authorization code AC and the transaction data to the bank 160 for confirmation. Those skilled in the art will now recognize that exactly where (at the bank 160 or by the owner 120 with the bank's software) the authorization code AC is calculated is a matter of implementation design choice. The bank 160 may even provide the owner 120 with a choice of which environment to operate in.

As another optional variation, if the authorization code AC is provided to the owner 120 by the bank 160, the authorization code AC may be stored on the card 110 by writing the authorization code AC to the magnetic strip or other type of memory associated with the card 110. As yet another alternative, the account number 114 and the authorization code AC may be printed out, most preferably in bar code format, so that the merchant 140 may scan the bar code in. In this alternative, the bar code print out may be provided to the designated person by the owner 120. Both of these techniques allow for more accurate transmission of the authorization code AC to the merchant 140 by reducing errors associated with manual data entry.

Those skilled in the art will now recognize that the present invention substantially addresses many of the drawbacks and deficiencies discussed above. By adding owner 120 selected parameters and an authentication code AC based upon the selected parameter, the security of and functional control over the card is greatly increased.

Those skilled in the art will also recognize that various modifications can be made without departing from the spirit of the present invention. For example, the equation may employ any conventional encryption techniques to calculate the authorization code AC and the confirmation authorization code CAC. For instance, an alternative to the DES algorithm may be employed. As another example, the inputs to the algorithm may be modified. For instance, the account number 114 may be included as an additional input into the equation. As yet another example, the bank 160 could return the confirmation authentication code CAC to the merchant 140 and have the merchant 140 do the comparison to determine whether or not to approve the transaction. As still yet another example, the bank 160 could provide the owner 120 with an option to allow the bank 160 to automatically reconfigure the selected subset of the plurality of authorization parameters on a periodic or random basis. Then, the bank 160 would inform the owner 120 of any limitations (time, location, amount, etc.) and seek the owner's acceptance before issuing the authorization code AC. Otherwise, if the particular limitations resulting from the bank's selection where inconvenient to the owner 120, then the owner 120 could modify the selections accordingly. As still yet another example, those skilled in the art will recognize that many of the steps, components and functionality discussed above may be distributed in any convenient manner between the owner 120, the merchant 140 and the bank 160. As illustrations, the owner 120 may do the authorization process separate from the bank 140, the merchant 140 may do the comparison of the codes and the bank 160 may select the authorization parameters.

As still yet another example, bank 160 may eliminate the need for storing and retrieving the transaction authorization record 165d. This may be accomplished by including an owner selections indicator representative of the owner selected authorization parameters and the associated selected parameter data $PD_1, PD_2 \ldots PD_N$ with the authorization code AC. This may be accomplished by either attaching the owner selections indicator as a header (preferably in the clear—not encrypted) attached to the authorization code AC or by embedding the owner selections indicator within the authorization code AC itself. In this way, when the authorization code AC, including the owner selections indicator, is uploaded to by the merchant 140 to the bank 160, the bank 160 may use the owner selections indicator to identify those corresponding components of the transaction data for input into the equation shown in FIG. 2A. Thus, the bank 160 can calculate the confirmation authentication code CAC without access to previously stored transaction records 165d. In other words, the bank 160 receives all of the data necessary to confirm the transaction when the merchant 140 uploads the transaction data. This reduces the memory storage and database searching requirements for the bank 160.

Therefore, the inventive concept in its broader aspects is not limited to the specific details of the preferred embodiments but is defined by the appended claims and their equivalents.

What is claimed is:

1. A method for authorizing purchases by an owner of an account previously established with a bank, the owner wanting to purchase an item from a merchant, the method comprising the step(s) of:
providing a plurality of authorization parameters available for use in calculating an authorization code associated with a specific transaction to purchase the item;
defining a selected subset of the plurality of authorization parameters;
establishing respective authorization parameter data for each of the selected authorization parameters;
calculating the authorization code corresponding to the established respective authorization parameter data associated with said specific transaction;
providing the authorization code associated with said specific transaction to the owner;
providing the authorization code associated with said specific transaction to the merchant;
receiving the authorization code associated with said specific transaction and transaction data from the merchant at the bank;
calculating a confirmation authorization code from the transaction data corresponding to the established respective authorization parameter data; and
comparing the authorization code associated with said specific transaction with the confirmation authorization code to determine whether or not to approve the transaction.

2. The method of claim 1, further comprising the step(s) of:
allowing the owner to define the selected subset of the plurality of authorization parameters and establish the respective authorization parameter data for each of the selected authorization parameters.

3. The method of claim 2, further comprising the step(s) of:
comparing the authorization code with the confirmation authorization code at the bank; and
if the authorization code and the confirmation authorization code do not match, then transmitting a rejection notice from the bank to the merchant.

4. The method of claim 3, further comprising the step(s) of:
storing a plurality of transaction authentication records at the bank where each transaction record is representative of a respective transaction and has associated therewith a respective authorization code; and
using the authorization code received at the bank from the merchant to locate a corresponding one of the plurality of transaction authentication records for use in determining whether or not to approve the transaction.

5. The method of claim 4, further comprising the step(s) of:
including with the plurality of authorization parameters a transaction sequence parameter.

6. The method of claim 3, further comprising the step(s) of:
providing an owner selections indicator representative of the selected subset of the plurality of authorization parameters and the respective authorization parameter data with the authentication code;
receiving the owner selections indicator from the merchant at the bank; and
using the owner selections indicator to identify the transaction data corresponding to the selected parameter data.

7. The method of claim 1, further comprising the step(s) of:
providing an owner selections indicator representative of the selected subset of the plurality of authorization parameters and the respective authorization parameter data with the authentication code;
receiving the owner selections indicator from the merchant at the bank; and
using the owner selections indicator to identify the transaction data corresponding to the selected parameter data.

8. A method of operating a transaction processing data center for authorizing purchases by an owner of an account previously established with a data center, the owner wanting to purchase an item from a merchant, the method comprising the step(s) of:
providing a plurality of authorization parameters available for use in calculating an authorization code associated with a specific transaction to purchase the item;
receiving an input from the owner of a selected subset of the plurality of authorization parameters;
receiving from the owner respective authorization parameter data for each of the selected authorization parameters;
calculating the authorization code corresponding to the received respective authorization parameter data associated with said specific transaction;
providing the authorization code associated with said specific transaction to the owner;
providing the authorization code associated with said specific transaction to the merchant;
receiving the authorization code associated with said specific transaction and transaction data from the merchant;
calculating a confirmation authorization code from the transaction data corresponding to the received respective authorization parameter data; and
comparing the authorization code associated with said specific transaction with the confirmation authorization code to determine whether or not to approve the transaction.

9. The method of claim 8, further comprising the step(s) of:
establishing a real time connection with the owner for receiving the selected subset of the plurality of authorization parameters and the respective authorization parameter data for each of the selected authorization parameters.

10. The method of claim 9, further comprising the step(s) of:
if the authorization code and the confirmation authorization code do not match, then transmitting a rejection notice to the merchant.

11. The method of claim 10, further comprising the step(s) of:
storing a plurality of transaction authentication records where each transaction record is representative of a respective transaction and has associated therewith a respective authorization code; and
using the authorization code received from the merchant to locate a corresponding one of the plurality of transaction authentication records for use in determining whether or not to approve the transaction.

12. The method of claim 11, further comprising the step(s) of:
including with the plurality of authorization parameters a transaction sequence parameter.

13. The method of claim 10, further comprising the step(s) of:
   providing an owner selections indicator representative of the selected subset of the plurality of authorization parameters and the respective authorization parameter data with the authentication code;
   receiving the owner selections indicator from the merchant; and
   using the owner selections indicator to identify the transaction data corresponding to the selected parameter data.

14. The method of claim 10, further comprising the step(s) of:
   providing an owner selections indicator representative of the selected subset of the plurality of authorization parameters and the respective authorization parameter data with the authentication code;
   receiving the owner selections indicator from the merchant; and
   using the owner selections indicator to identify the transaction data corresponding to the selected parameter data.

15. The method of claim 8, further comprising the step(s) of:
   providing an owner selections indicator representative of the selected subset of the plurality of authorization parameters and the respective authorization parameter data with the authentication code;
   receiving the owner selections indicator from the merchant; and
   using the owner selections indicator to identify the transaction data corresponding to the selected parameter data.

16. A system for authorizing purchases by an owner of an account previously established with a bank, the owner wanting to purchase an item from a merchant, the system comprising:
   means for providing a plurality of authorization parameters available for use in calculating an authorization code associated with a specific transaction to purchase the item;
   means for defining a selected subset of the plurality of authorization parameters;
   means for establishing respective authorization parameter data for each of the selected authorization parameters;
   means for calculating the authorization code corresponding to the established respective authorization parameter data associated with said specific transaction;
   means for providing the authorization code associated with said specific transaction to the owner;
   means for providing the authorization code associated with said specific transaction to the merchant;
   means for receiving the authorization code associated with said specific transaction and transaction data from the merchant at the bank;
   means for calculating a confirmation authorization code from the transaction data corresponding to the established respective authorization parameter data; and
   means for comparing the authorization code associated with said specific transaction with the confirmation authorization code to determine whether or not to approve the transaction.

17. The system of claim 16, further comprising:
   means for allowing the owner to define the selected subset of the plurality of authorization parameters and establish the respective authorization parameter data for each of the selected authorization parameters.

18. The system of claim 17, wherein:
   the means for comparing the authorization code with the confirmation authorization code is located at the bank; and
   further comprising:
   if the authorization code and the confirmation authorization code do not match, means for transmitting a rejection notice from the bank to the merchant.

19. The system of claim 18, further comprising:
   means for storing a plurality of transaction authentication records at the bank where each transaction record is representative of a respective transaction and has associated therewith a respective authorization code; and
   means for using the authorization code received at the bank from the merchant to locate a corresponding one of the plurality of transaction authentication records for use in determining whether or not to approve the transaction.

20. The system of claim 19, further comprising:
   means for including with the plurality of authorization parameters a transaction sequence parameter.

21. The system of claim 18, further comprising:
   means for providing an owner selections indicator representative of the selected subset of the plurality of authorization parameters and the respective authorization parameter data with the authentication code;
   means for receiving the owner selections indicator from the merchant at the bank; and
   means for using the owner selections indicator to identify the transaction data corresponding to the selected parameter data.

22. The system of claim 16, further comprising:
   means for providing an owner selections indicator representative of the selected subset of the plurality of authorization parameters and the respective authorization parameter data with the authentication code;
   means for receiving the owner selections indicator from the merchant at the bank; and
   means for using the owner selections indicator to identity the transaction data corresponding to the selected parameter data.

* * * * *